United States Patent [19]
Zablocki et al.

[11] Patent Number: 6,139,895
[45] Date of Patent: *Oct. 31, 2000

[54] VISCOSITY STABLE ACIDIC EDIBLE LIQUID COMPOSITIONS AND METHOD OF MAKING

[75] Inventors: Linda J. Zablocki, Mountain View; W. Scott Bousman, San Diego, both of Calif.; Yogesh Solanki, South Croydon, United Kingdom; Susan B. Milovanovic, Burr Ridge, Ill.; Alan King, Westfield, N.J.

[73] Assignee: Monsanto Company, St. Louis, Mo.

[ * ] Notice: This patent issued on a continued prosecution application filed under 37 CFR 1.53(d), and is subject to the twenty year patent term provisions of 35 U.S.C. 154(a)(2).

[21] Appl. No.: 09/347,259

[22] Filed: Jul. 6, 1999

[51] Int. Cl.⁷ ............... A23L 1/06; A23L 1/05; A23L 2/52; A23L 1/39
[52] U.S. Cl. ........... 426/573; 426/330.3; 426/589; 426/590; 426/599; 426/602; 426/638; 426/650
[58] Field of Search ............... 426/330.3, 573, 426/589, 590, 599, 602, 638, 650

[56] References Cited

U.S. PATENT DOCUMENTS

| | | | |
|---|---|---|---|
| 3,020,206 | 2/1962 | Patton et al. | 195/31 |
| 3,020,207 | 2/1962 | Patton | 195/31 |
| 3,391,060 | 7/1968 | McNeely | 195/31 P |
| 4,154,654 | 5/1979 | Campaigne | 195/31 P |
| 4,352,882 | 10/1982 | Maury | 435/101 |
| 4,369,125 | 1/1983 | Kragen et al. | 252/316 |
| 4,375,512 | 3/1983 | Richmon | 435/104 |
| 5,514,791 | 5/1996 | Doherty et al. | 536/114 |
| 5,792,502 | 8/1998 | Montezinos | 426/590 |

FOREIGN PATENT DOCUMENTS

97/46656  12/1997  WIPO .

OTHER PUBLICATIONS

Cheetham, N. W. H. et al., 5 Carbohydr. Polym., pp. 399–406 (1985).
Hassler, R. A. et al., 6 Biotechnol. Prog., pp. 182–187 (1990).
Jansson, P. E. et al., 45 Carbohydr. Research, pp. 275–282 (1975).
Stankowski, J. D. et al., 241 Carbohydr. Research, pp. 321–326 (1993).
Tait, M. I., et al., 13 Carbohydr. Polym., pp. 133–148 (1990).

*Primary Examiner*—Helen Pratt
*Attorney, Agent, or Firm*—Fitzpatrick, Cella, Harper & Scinto

[57] ABSTRACT

This invention contains an acidic edible liquid composition comprising a low acetylated xanthan gum in an amount effective to substantially sustain the initial viscosity of the composition for at least about four months. Particularly preferred compositions include beverages and syrups. Beverages include, without limitation, carbonated and non-carbonated soft drinks, still beverages, fruit-juice-type beverages, squashes and cordials, alcoholic and nonalcoholic, their concentrates and mixtures thereof. This invention also contains a method for stabilizing an acidic edible liquid composition which comprises admixing therewith an effective amount of a low acetylated xanthan gum in an amount effective to substantially maintain the initial viscosity of the composition for at least about four months under typical storage conditions.

21 Claims, No Drawings

VISCOSITY STABLE ACIDIC EDIBLE LIQUID COMPOSITIONS AND METHOD OF MAKING

BACKGROUND OF THE INVENTION

1. Field of the Invention

This invention relates to viscosity stable acidic edible liquid compositions including, for example, acidic syrups and acidic beverages, such as carbonated or non-carbonated beverages, and the like. The invention also relates to a method for substantially sustaining the viscosity of such edible liquid compositions even after prolonged storage.

2. Related Background Art

Acidic edible liquid compositions are well known. Such compositions include, for example, syrups, beverages, salad dressings, cordials, juices, certain jams and jellies, as well as fruit bakery filings. Traditional xanthan gum has often been used in such products to control the viscosity of the composition and modify its mouthfeel.

Beverages enjoy worldwide sales and the full mouthfeel of the beverage is very important in its customer acceptance. Beverages such as soft drinks may be stored in warehouses and are transported by ship, rail and truck. During such transportation and storage, as well as while on the store shelf, the stability of the beverage must be maintained. Low caloric beverages with juice have become very important to a more health and weight conscious society. It is important that such low caloric beverages continue to provide pleasant mouthfeel to customers.

Various compositions of acidic syrups and acidic beverages are known. Illustrative compositions include those disclosed in Flavor Technology, Soft Drinks and Beverages, Chapter 17, page 497, which notes that typical soft drinks, whether concentrated or not, contain ingredients such as fruit juices, natural essences, flavorings usually in the form of emulsions, colors, preservatives, heading and or clouding agents, acidulents, sugar and or high intensity sweetening agents and water. This publication is incorporated herein in its entirety by reference.

Mouthfeel modifiers like traditional xanthan gum can be added to acidic beverages, in particular carbonated soft drinks that are sweet and which contain one or more carbohydrate and/or high intensity sweeteners. While the use of traditional xanthan gum can modify the mouthfeel of a beverage, it has also been shown to suppress overall flavor and sweetness. And while traditional xanthan gum functions quite well initially in an acidic medium, over the typical shelf life of such an acidic product, the acidic product will lose viscosity. This is particularly true at elevated processing and storage temperatures, e.g., 21° C. to about 32° C. or more.

Thus there is a need for improved acidic edible liquid compositions, such as syrups and beverages, which are viscosity stable compositions in that they substantially maintain their viscosity or have a reduced viscosity loss over an extended time period compared to currently available products.

SUMMARY OF THE INVENTION

This invention is directed to a viscosity stable acidic edible liquid composition comprising a low acetylated xanthan gum. The low acetylated xanthan gum is present in the composition in an amount effective to substantially maintain its initial viscosity over an extended time period, e.g., for at least four weeks at a storage temperature of 45° C. or less.

This invention is also directed to the method of preparing the viscosity stable composition of the invention. Particularly preferred acidic edible liquid compositions of this invention include acidic syrups and acidic beverages. It has been found that the perception of maximum sweetness and overall flavor may be maintained in such compositions over an extended time period.

DETAILED DESCRIPTION OF THE INVENTION

This invention is directed to the use of an effective amount of a low acetylated xanthan gum in an acidic edible liquid composition (having a pH of below about 7) to provide enhanced viscosity stability over time. As used herein edible liquid compositions include flowable compositions at room temperature, e.g., 21° C., that are acidic edible aqueous and/or alcoholic compositions. Such compositions include, for example, carbonated and noncarbonated beverages, alcoholic and nonalcoholic cordials, fruit drinks syrups, salad dressings, fruit fillings and the like. The acidic edible liquid composition may also be frozen, e.g. a frozen fruit juice composition. The most preferred compositions of this invention are acidic syrup and acidic beverage compositions.

Xanthan gum is a heteropolysaccharide of high molecular weight, composed of D-glucose, D-mannose and D-glucuronate moieties in a molar ratio of 2:2:1 respectively. The term "traditional xanthan gum", as used in the present context, includes native xanthan gum. Native xanthan gum may be produced in agitated culture by a strain of Xanthomonas campestris and a base medium containing an appropriate carbon or energy source, protein or amino acid, or other nitrogen (organic or inorganic) source, nutrients, and sufficient vitamins, minerals, and co-factor required for growth, as has been described in numerous publications and patents previously (compare, for example U.S. Pat. Nos. 3,020,206, 3,020,207, 3,391,060, and 4,154,654).

Upon completion of the process of fermentation, the resultant broth normally contains 10 to 150 g/liter of native xanthan gum, and its pH ranges from approximately 5.0 to 8.0. The broth is then typically heat-treated at a temperature of 50° C. to 100° C. for 5 to 60 minutes. The xanthan gum is then usually recovered from the broth by adding a precipitating agent, for example isopropanol, separating, drying and milling to a powder. The fermentation process as well as the isolation and purification of the xanthan gum is set forth in U.S. Pat. No. 4,352,882 and U.S. Pat. No. 4,375,512, both of which are hereby incorporated by reference in their entirety.

Traditional xanthan gum typically contains approximately 5% acetate. Acetate substituents are found on xanthan in two different locations. One is located through an ester linkage at the C(6) position of the mannose residue adjacent to the main chain (Jansson, P. E., Kenne, L. and Lindberg, B., Carbodyr. Research, 45 (1975) 275–282). Another acetate substituent may be found on the terminal mannose residue of the side chain when this mannose residue is not pyruvylated (Hasser, R. A. and Doherty, D. H., Biotechnol. Prog., 6 (1990) 182–187). This second acetyl substituent is typically found at very low levels in normal xanthan. The acetate content (% based on solids) may be determined by hydrolyzing the xanthan gum under acidic conditions, subjecting the hydrolyzate to high-performance ion-exclusion chromatography, and analyzing by a chemically suppressed conductivity detection method or equivalent thereof. Pertinent analytical articles disclosing methods useful for determining acetate content include: N. W. H. Cheetham and A.

Punruckvong, Carbohydr. Polym., 5 (1985) 399–406; M. I. Tait, I. W. Sutherland and A. J. Clark-Sturman, Carbohydr. Polym., 13 (1990) 133–148; J. D. Stankowski, B. E. Mueller and S. G. Zeller, Carbohydr. Res., 241 (1993) 321–326; all of which are incorporated herein by reference in their entirety.

As employed herein, the term "low acetylated xanthan gum" includes a xanthan gum (or a mixture(s) thereof) having an acetate content of about 0 (nonacetylated) to about 1.5%, preferably from about 0 to 1.0%, and more preferably from about 0 to about 0.5%. Low acetylated xanthan gum includes those xanthan gums which have been deacetylated (such as by chemical means described infra) and nonacetylated xanthan gum. The preferred low acetylated xanthan gum for use in compositions and methods of this invention is nonacetylated xanthan gum.

Nonacetylated xanthan gum may be prepared by the use of mutant strains of Xanthomonas campestris as described in U.S. Pat. No. 5,514,791, the disclosure of which is incorporated by reference herein.

Low acetylated xanthan gum includes without limitation treated and modified xanthan gum, such as deacetylated xanthan gum, nonacetylated xanthan gum, low acetylated xanthan gum cross-linked with polyvalent cations, gum/glyoxal complexes, mixtures thereof and the like.

Applicants have discovered that the use of an effective amount of low acetylated xanthan gum in acidic edible liquid compositions substantially maintains viscosity over time. More particularly, it has been found that such acidic syrup and beverage compositions substantially hold their viscosity over time without hiding the perception of maximum sweetness and overall flavor in those compositions.

The use of low acetylated xanthan gum is particularly useful in acidic edible liquid compositions, and concentrates thereof, that exist at or are formulated to a pH of below about 7, and more preferably below a pH of about 4 and most preferably below a pH of about 3.3. A particularly preferred pH range is from about 3.85 to about 2.0, more preferably about 3.2 to about 2.0. However, those of skill in the art will recognize that this invention may find use at various acidic pH levels depending on the circumstances of such use.

The compositions of this invention contain the low acetylated xanthan gum in an amount effective to substantially maintain the viscosity of the composition for an extended time period. The time period necessary to substantially maintain viscosity will be dependent upon the desired shelf life of the product, but may range from weeks to months to years. The extended period of time may be as little as 4 to 6 weeks, but, generally, the extended period of time is at least four months, preferably at least 7 months and more preferably at least 9 months. As used herein, viscosity is considered to be substantially maintained if the initial viscosity does not decrease more than 15% over an eight month period of storage at about 21° C., and not more than 5% over a 4 month period of storage at about 21° C.

The amount of low acetylated xanthan gum used in the acidic edible liquid compositions of this invention will vary depending on the nature of the composition, but can be readily determined by one of ordinary skill in the art without undue experimentation.

For an acidic syrup, typically this effective amount of low acetylated xanthan gum is in the range from about 0.006 to about 1, more preferably from about 0.024 to about 0.75, and most preferably from about 0.024 to about 0.6 percent by weight of the acidic syrup. However, greater or lesser amounts may be found to be effective as determined by many factors including the other ingredients with which the low acetylated xanthan gum of this invention will find use.

For an acidic beverage, typically this effective amount of low acetylated xanthan gum is in the range from about 0.001 to about 0.5, more preferably from about 0.004 to about 0.2, and most preferably from about 0.004 to about 0.1 percent by weight of the acidic beverage. However, greater or lesser amounts may be found to be effective as determined by many factors including other ingredients with which the low acetylated xanthan gum of this invention will find use. The acidic beverage composition will generally also contain at least one sweetener in an amount effective to sweeten the composition with the balance of the composition typically being water.

The sweeteners used in the compositions of this invention may be high intensity sweeteners or conventional caloric sweeteners. Such high intensity sweeteners may include, but are not limited to aspartame, acesulfame-K, sucralose, saccharin, alitame, cyclamates, stevia derivatives, thaumatin, or polyol sugar alcohols. Such caloric sweeteners may include but are not limited to sucrose (in liquid or granular form), high fructose corn syrup, invert sugar, dextrose, crystalline fructose, and high conversion corn syrup. Mixtures of sweeteners may also be employed as desired. The amount of sweetener or mixture of sweetener used in the compositions of this invention can be readily determined by one of ordinary skill in the art.

The acidic syrups may be prepared, for example, by adding about 70% of the water eventually needed for the acidic syrup to a mixing vessel. A preservative may be added which can be sodium benzoate, (e.g., 0.1%–0.3% wt.) or the like. A low acetylated xanthan gum solution (e.g., about 3% wt.) may then be added. This low acetylated xanthan gum solution may be prepared by admixing an effective amount of a low acetylated xanthan gum with water in a manner and to a degree such that the low acetylated xanthan gum should be substantially or fully hydrated. The concentration of the low acetylated xanthan gum in the presolution is typically between 0.5% to 1.5% by weight. A food grade acid such as phosphoric acid, citric acid, ascorbic acid or the like (e.g., 0.2%–0.4% wt.) may be added. A sweetener, such as sucrose or aspartame, or mixture of sweeteners may also be added. If aspartame is used, the syrup will generally contain about 0.2% to about 0.5% by weight of syrup. The amount of sweetener will vary, of course, depending on the sweetener or mixtures thereof employed and the expected dilution to be made to the syrup when preparing the beverage. A buffer such as sodium citrate (e.g., 0.1%–0.2% wt.), caffeine (e.g., 0.03%–1.0% wt.) and a flavor, (e.g., cola flavor of about 1%–2% wt.) may also be added. Other possible flavors include, without limitation, orange, lemon, grape and the like in amounts readily understood by those skilled in the drink. A color such as an FD&C color may be added and admixed therewith. The volume is then brought up to a final volume as desired.

The acidic beverage composition of this invention may be prepared, for example, from the acidic syrup compositions of this invention based on a dilution or a throw of the acidic syrup. Those of skill in the art recognize that a common throw for a cola CSD (carbonated soft drink) is 1+5 so that a preparer uses one part Cola syrup and five parts water to prepare the acidic beverage from the acidic syrup. The amount of acidic syrup employed to prepare the acidic beverage compositions of this invention will of course vary depending on the concentration of the syrup and the desired end product. Such amount can be readily determined by those of ordinary skill in the art.

The compositions of this invention includes, without limitation, acidic syrups for carbonated and non-carbonated soft drinks, still beverages, fruit-juice-type beverages, squashes and cordials, both alcoholic and nonalcoholic, and their concentrates. The compositions of this invention also include, for example, fountain syrup, beverages such as carbonated soft drinks, alcoholic cordials and squash concentrates, lemon, lime or grapefruit juice, some jams and jellies, bakery fillings, bakery flavor emulsion, bakery fillings, pickle brine, frozen juice novelties, sour confection, fruit pie fillings, and the like. Exemplary cordial compositions of this invention include, for example, aquavit, pernodor kummel, creme de menth, creme de cocoa, cherry brandy, coffee liquor, grand marnier, drambuie and chartreuse or benedictine, mixtures thereof and the like.

Compositions of this invention may be used with liquors including without limitation cream liquors such as those disclosed in ENCYCLOPEDIA, Food Science And Food Technology And Nutrition, Macrae, R;, Robinson R. K., Sadler, M. J., Academic Press, Harcourt Brace Jovanovich, Publishers, 1993, See Volume 4 in particular pages 2751–2760. This Encyclopedia along with these pages 2751–2760 are incorporated herein in their entirety by reference.

Methods for preparing various compositions of this invention are illustrated without limitation in the Examples provided herein. Those of skill in the art will recognize that it may be necessary or expedient to alter the processes as illustrated herein to obtain the maximum amount of hydration of low acetylated xanthan gum. This is generally brought about by increased mixing time of the xanthan gum with water and/or increased shearing.

The following examples are provided by way of illustration and are not intended to limit the invention in any way.

EXAMPLE 1

Part A—Preparation of Chemically Deacetylated Xanthan Gum

Low acetylated xanthan gum was produced by chemical deacetylation starting with commercial Keltrol® Xanthan Gum (acetate content about 5–6%) available from the Monsanto Kelco Biopolymers, San Diego, Calif. The production was carried out in a continuous flow, in-line system. About 10 grams of about 45 wt % KOH per liter was added to and mixed with xanthan beer (4.5 g pure KOH/L). The beer was heated to about 110° C. and held at that temperature for about 30 seconds. The beer was then cooled to less than about 50° C. The xanthan gum fiber was precipitated from the cooled beer by mixing the cooled beer with about 2.5 volumes of a solution of about 85 weight % isopropanol and about 15 wt. % water. Xanthan gum fiber was pressed from the resulting solution and dried to make a composition having about 87 to about 93% solids. This pressed xanthan gum fiber composition was then milled to make a powder that passed a 40 mesh screen to produce the desired low acetate xanthan gum. This low acetate xanthan gum had an acetate content of about 1% by weight as compared to normal commercial Keltrol® Xanthan gum which has about 5–6 wt % acetate.

Part B—Preparation of nonacetylated Xanthan Gum

Three lots of nonacetylated xanthan gum (1B, 2B and 3B) illustrative of a low acetylated xanthan gum were made in a continuous flow, in-line system according to the following procedure. The Nonacetylated xanthan beer was prepared in a fermentation system using a strain of Xanthomonas campestris that had been mutated to inactivate the acetylase genes (I and II). The resulting beer was heated to a temperature of about 60° C. to 70° C. and held at that temperature for about 30 seconds. The beer was then cooled to a temperature of less than about 50° C. Xanthan gum fiber was then precipitate by mixing about 2.5 volumes of a solution of 85 wt. % and 15 wt. % water with the cooled beer. Xanthan gum fiber was pressed from the cooled solution and dried to make a composition of about 87 to about 93 wt % solids. This composition was then milled to a powder that will pass through a 40 mesh screen by milling. Lots 1C, 2C and 3C were made from the same procedure as above with the exception that steps of heating and cooling the beer were omitted.

Acetate contents for these xanthan gums were as follows:

|  | 1B | 1C | 2B | 2C | 3B | 3C |
|---|---|---|---|---|---|---|
| Acetate Content (wt %) | 0.34 | 0.34 | 0.17 | 0.30 | 0.24 | 0.23 |

Several acidic syrup and acidic beverage compositions were prepared using a chemically deacetylated xanthan gum prepared according to Example 1 Part A or a low acetylated xanthan gum prepared according to Example 1 Part B. Comparative compositions were prepared using Keltrol® Xanthan Gum as a traditional xanthan gum. The pH and viscosity of each example were evaluated as described below. The viscosity was determined using a Brookfield LVF viscometer (60 rpm) with the appropriate spindle at ambient temperature.

EXAMPLE 2

Deacetylated xanthan gum (1.0% w/w) of Example 1A (acetate content 1%) and sodium benzoate (0.33% w/w) were mixed with deionized water. Next, 150 g of the composition was diluted to 500 grams by the addition of deionized water. The composition was titrated to pH 4.0 with phosphoric acid. The initial viscosity was 195 cP. After 39 weeks storage at ambient temperature, e.g., 22° C., the pH was 3.9 and the viscosity was 177.5 cp. The Loss in viscosity during storage was 17.5 cP or about 9%.

COMPARATIVE EXAMPLE 1

A composition was made in a substantially similar manner to Example 1, with the exception that native xanthan gum (Keltrol® T available from the Monsanto Kelco Biopolymers, San Diego, Calif.) with 5 to 6% acetate content was used. The pH of this composition was 4.0 and the viscosity was 175 cP. After 39 weeks storage the pH was 3.8 and the viscosity was 140 cP. The loss in viscosity during storage was 35 cp or 20%, i.e., twice the loss of the inventive composition of Example 1.

EXAMPLE 3

A composition was prepared in a manner similar to Example 2, with the exception that phosphoric acid was added to the composition in an amount necessary to adjust the pH to 2.8. The initial viscosity was 170 cp. After 39 weeks storage the pH was 2.8 and the viscosity was 160 cP. The loss in viscosity during storage was 10 cP or about 6%.

COMPARATIVE EXAMPLE 2

A composition was prepared in a manner similar to Comparative Example 1, with the exception that phosphoric acid was added to the composition in an amount necessary to adjust the pH to 2.8. The initial viscosity was 172.5 cP. After 39 weeks storage the pH was 2.7 and the viscosity was 110 cP. The loss in viscosity during storage was 62.5 cP or about 36%, i.e., six times the loss of the inventive composition of Example 2.

EXAMPLE 4

A composition was prepared in a manner similar to Example 2, with the exception that a nonacetylated xanthan gum prepared in Example 1, Part B was used. The pH of the composition was 4.0 and the initial viscosity was 197.5 cP. After 24 weeks storage the pH was 4.2 and the viscosity was 190 cP, a loss of only 7.5 cP or about 4%.

EXAMPLE 5

A composition was prepared in a manner similar to Example 4 with the exception that phosphoric acid was added to the composition in an amount necessary to adjust the pH to 2.8. The initial viscosity was 180 cP. After 24 weeks storage the pH was 2.9 and the viscosity was 176 cP, a loss of only 4 cP or about 2%.

EXAMPLE 6

Several cola acidic syrup compositions containing 0.03% by weight of the nonacetylated xanthan gums prepared according to Example 1 Part B were prepared by first preparing a 1% aqueous solution of the gums.

The acidic syrup compositions contained the following components:

| | |
|---|---|
| Sodium Benzoate | 0.16 |
| Phosphoric Acid | 0.2436 |
| Citric Acid | 0.0264 |
| Caffeine | 0.03 |
| Mineral Blend* | 1.00 |
| Aspartame | 0.33 |
| Disodium phosphate | 0.188 |
| Nonacetylated Xanthan Gum (1% solution) | 3.0 |
| Cola Flavor Base | 1.72 |
| Deionized Water | balance |

*Blend of minerals added to deionized water to approximate typical treated plant water.

The particular nonacetylated xanthan gum, initial pH and viscosity of the syrups are set forth in Table 1. The viscosity was determined with a Brookfield automatic, Model DV-11+ viscometer (speed set to 60 rpm) with a UL adapter. The pH and viscosity were monitored over a period of 6 weeks storage at 21° C. and 32° C. as indicated in Table 1. The percentage loss in viscosity is also set forth in Table 1.

TABLE 1

Cola Acidic Syrups

| Exam-ple | Xanthan | Initial pH | cP | Storage time | temp | After Storage pH | cP | % cP loss |
|---|---|---|---|---|---|---|---|---|
| 6-A | 1B | 3.24 | 5.51 | 6 wks | 21° C. | 3.27 | 5.59 | 0 |
| 6-B | 1B | 3.24 | 5.51 | 6 wks | 32° C. | 3.22 | 5.51 | 0 |
| 6-C | 1C | 3.26 | 5.61 | 6 wks | 21° C. | 3.25 | 5.66 | 0 |
| 6-D | 1C | 3.26 | 5.61 | 6 wks | 32° C. | 3.23 | 5.66 | 0 |
| 6-E | 2B | 3.26 | 5.86 | 7 wks | 21° C. | 3.21 | 6.06 | 0 |
| 6-F | 2B | 3.26 | 5.86 | 5 wks | 32° C. | 3.21 | 5.39 | 8.0% |
| 6-G | 2C | 3.26 | 5.99 | 7 wks | 21° C. | 3.21 | 5.71 | 4.7% |

TABLE 1-continued

Cola Acidic Syrups

| Exam-ple | Xanthan | Initial pH | cP | Storage time | temp | After Storage pH | cP | % cP loss |
|---|---|---|---|---|---|---|---|---|
| 6-H | 2C | 3.26 | 5.99 | 5 wks | 32° C. | 3.24 | 5.46 | 8.8% |
| 6-I | 3B | 3.27 | 5.66 | 7 wks | 21° C. | 3.20 | 5.74 | 0 |
| 6-J | 3B | 3.27 | 5.66 | 5 wks | 32° C. | 3.20 | 5.31 | 6.2% |
| 6-K | 3C | 3.26 | 5.76 | 7 wks | 21° C. | 3.21 | 5.89 | 0 |
| 6-L | 3C | 3.26 | 5.76 | 5 wks | 32° C. | 3.21 | 5.26 | 6.9% |

EXAMPLE 7

Several cola carbonated acidic beverage composition were prepared using the cola acidic syrups of Example 6 by diluting 1 part syrup with 5 parts carbonated water. The initial pH and viscosity of the beverages are set forth in Table 2. The viscosity was measured in the same manner as Example 6. The pH and viscosity were monitored over a period of time between 5 to 7 weeks at 21° C. and 32° C. as indicated in Table 2. The percentage loss in viscosity is also set forth in Table 2.

TABLE 2

Cola Carbonated Acidic Beverages

| Exam-ple | Xanthan | Initial pH | cP | Storage time | temp | After Storage pH | cP | % cP loss |
|---|---|---|---|---|---|---|---|---|
| 7-A | 6-A | 3.38 | 1.66 | 6 wks | 21° C. | 3.38 | 1.76 | 0 |
| 7-B | 6-B | 3.38 | 1.66 | 6 wks | 32° C. | 3.36 | 1.59 | 4.2% |
| 7-C | 6-C | 3.39 | 1.69 | 6 wks | 21° C. | 3.41 | 1.61 | 4.7% |
| 7-D | 6-D | 3.39 | 1.69 | 6 wks | 32° C. | 3.36 | 1.61 | 4.7% |
| 7-E | 6-E | 3.38 | 1.74 | 7 wks | 21° C. | 3.35 | 1.94 | 0 |
| 7-F | 6-F | 3.38 | 1.74 | 5 wks | 32° C. | 3.37 | 1.76 | 0 |
| 7-G | 6-G | 3.40 | 1.76 | 7 wks | 21° C. | 3.34 | 1.96 | 0 |
| 7-H | 6-H | 3.40 | 1.76 | 5 wks | 32° C. | 3.39 | 1.86 | 0 |
| 7-I | 6-I | 3.39 | 1.74 | 7 wks | 21° C. | 3.34 | 1.89 | 0 |
| 7-J | 6-J | 3.39 | 1.74 | 5 wks | 32° C. | 3.37 | 1.79 | 0 |
| 7-K | 6-K | 3.39 | 1.76 | 7 wks | 21° C. | 3.34 | 1.81 | 0 |
| 7-L | 6-L | 3.39 | 1.76 | 5 wks | 32° C. | 3.38 | 1.76 | 0 |

COMPARATIVE EXAMPLE 3

A cola acidic syrup composition was prepared in a manner similar to Example 6, with the exception that Keltrol® T Xanthan Gum, a traditional xanthan gum, was employed. The syrup composition had pH of about 3.2 and a viscosity of about 5 cp. The pH and viscosity were monitored over a period of 6 weeks storage at 21° C. and 32° C. When compared to the compositions of this invention containing low acetylated xanthan gum, the results showed that the inventive syrup compositions were more stable over time.

EXAMPLE 8

A cola flavored syrup composition was prepared having the following components:

| | wt. % |
|---|---|
| Sodium Benzoate | 0.24 |
| Cola Acid | 0.32 |
| Aspartame | 0.06 |

|  | wt. % |
|---|---|
| Saccharin | 0.14 |
| Nonacetylated Xanthan Gum (1% solution) | 4.50 |
| Mineral Blend | 1.00 |
| Cola Flavor | 1.72 |
| Deionized Water | balance |

A cola flavored beverage was then prepared by mixing 1 part of the syrup with 5 parts water.

EXAMPLE 9

An orange flavored syrup composition was prepared having the following components:

|  | wt. % |
|---|---|
| Sodium Benzoate | 0.16 |
| Citric Acid | 0.70 |
| Aspartame | 0.05 |
| Saccharin | 0.10 |
| Nonacetylated Xanthan Gum (1.% solution) | 3.00 |
| Sodium Citrate | 0.03 |
| Mineral Blend | 0.07 |
| Yellow #6 (1% solution) | 0.80 |
| Orange emulsion | 0.70 |
| Deionized Water | balance |

An orange flavored beverage was then prepared by mixing 1 part of the syrup with 3 parts water.

EXAMPLE 10

A lemon flavored syrup composition was prepared having the following components:

|  | wt. % |
|---|---|
| Sodium Benzoate | 0.22 |
| Citric Acid | 0.78 |
| Aspartame | 0.11 |
| Saccharin | 0.28 |
| Nonacetylated Xanthan Gum (1.% solution) | 8.25 |
| Mineral | 1.84 |
| Yellow #5 (1% solution) | 2.26 |
| Lemon emulsion | 0.66 |
| Lemon juice | 4.28 |
| Deionized Water | balance |

A lemon flavored beverage was then prepared by mixing 1 part of the syrup with 10 parts water.

EXAMPLE 11

A tartar sauce composition is prepared having the following components:

|  | wt. % |
|---|---|
| Water | 30.09 |
| Sweet pickle relish | 22.12 |
| Vegetable oil | 19.66 |
| Vinegar, 10% (100 grain) | 12.77 |
| Sugar, granular | 5.24 |
| Salt | 4.12 |
| Fresh whole eggs | 3.84 |
| Capers, chopped | 1.10 |
| Mustard, dry | 0.64 |
| Low acetylated Xanthan gum | 0.45 |
| Parsley, chopped, dry | 0.03 |

The tartar sauce composition is prepared by first dry blending the low acetylated xanthan gum with half the sugar. The blend is dissolved in the water and vinegar with strong agitation. This is followed by the addition of the egg, remaining sugar, mustard and salt. The vegetable oil is then slowly added. This mixture is then homogenized with a colloid mill, followed by the addition of the remaining ingredients. The resulting tartar sauce composition is a stable sauce emulsion.

EXAMPLE 12

A sweet pickle relish composition is prepared having the following components:

|  | wt. % |
|---|---|
| Pickles, chopped, pressed | 49.06 |
| Sugar, granular | 30.00 |
| Vinegar, 10% (100 grain) | 20.00 |
| Mustard seed | 0.54 |
| Red peppers, chopped (dehydrated) | 0.22 |
| Low acetylated Xanthan gum | 0.10 |
| Celery seed | 0.97 |
| Spice oil | 0.01 |

The low acetylated xanthan gum is first dry blended with about five times its weight of sugar. The remaining sugar and other ingredients are combined. While mixing, the dry blend is slowly added to the mixture of relish ingredients. A stable sweet pickle relish results.

EXAMPLE 13

A bakery flavor emulsion is prepared having the following components:

|  | wt. % |
|---|---|
| Water | 85.91 |
| Citrus oil, cold pressed, single fold | 10.80 |
| Gum arabic, powdered | 2.00 |
| Low acetylated xanthan gum | 0.70 |
| Citric acid, anhydrous | 0.39 |
| Sodium benzoate | 0.20 |

The bakery flavor emulsion is prepared by mixing the low acetylated xanthan gum, gum arabic, citrus oil, sodium benzoate and citric acid in water in the order recited. The resulting bakery flavor emulsion is highly stable.

EXAMPLE 14

A bakery filling composition is prepared having the following components:

|  | wt. % |
| --- | --- |
| Sugar (refined sucrose, granulated) | 34.00 |
| Instant Cleargel pregelatinized starch (National Starch, Bridgewater, NJ) | 2.00 |
| KELSET alginate (Monsanto Company, St. Louis, MO) | 0.75 |
| Adipic acid, fine, granular | 0.60 |
| Low acetylated xanthan gum | 0.13 |
| Potassium Sorbate | 0.05 |
| Sodium Benzoate | 0.05 |
| Water | 62.42 |

The bakery filling composition is prepared by mixing the dry ingredients until well blended and then adding the water at a temperature of 71° to 77° C. while stirring with a whip wire. The resulting bakery filling composition may also contain colorant and flavor as desired.

EXAMPLE 15

An orange juice drink concentrate composition is prepared having the following components:

|  | wt. % |
| --- | --- |
| Invert sugar, liquid, 76' | 40.000 |
| Water | 30.312 |
| Frozen orange juice concentrate, 64' Brix | 23.400 |
| Citric acid, anhydrous | 2.200 |
| Cloud agent | 2.000 |
| Sodium citrate dihydrate | 1.400 |
| Spray-dried artificial orange juice flavor | 0.200 |
| Ascorbic acid, USP | 0.136 |
| Carboxymethyl cellulose | 0.120 |
| Natural orange juice flavor | 0.080 |
| Low acetylated xanthan gum | 0.080 |
| Orange oil, cold pressed | 0.060 |
| FD&C Yellow #5 | 0.006 |
| FD&C Yellow #6 | 0.006 |

The orange juice drink concentrate is prepared by first hydrating the xanthan gum and carboxymethyl cellulose in water under moderate shear. Next, the dry ingredients are pre-blended and then added to the water with mixing until homogenous. The orange oil and orange concentrate are then added with low shear, followed by the addition of liquid invert sugar. The resulting concentrate may be frozen for storage. The frozen concentrate is reconstituted by mixing 1 part concentrate to 3 parts water.

EXAMPLE 16

A salad dressing composition is prepared having the following components:

|  | wt. % |
| --- | --- |
| Water | 39.258 |
| Vegetable oil | 38.000 |
| Vinegar, white, 10%, (100 grain) | 11.540 |
| Sugar, granular | 6.000 |
| Egg yolks, frozen, salted | 2.000 |
| Salt | 1.000 |
| Anchovie paste | 0.600 |
| Monosodium glutamate | 0.500 |
| Low acetylated xanthan gum | 0.350 |
| Onion powder | 0.300 |
| Garlic powder | 0.300 |
| Green onion, minced, dehydrated | 0.150 |
| Lime green, shade | 0.002 |

The salad dressing composition is prepared by first slurrying the low acetylated xanthan gum in two to five times by weight of the oil. The slurry is then added to the water. The dry ingredients are dry blended with the exception of the green onions. The dry-blend mixture is added to the slurry followed by the addition of the egg yolks and anchovie paste. The remaining oil is slowly added to the slurry. Next the vinegar is added and the resulting mixture is homogenized using a colloid mill. Lastly, the green onions are added with stirring. The resulting salad dressing composition has a pH of about 3.2 and is a smooth textured, easily pourable composition with excellent emulsion stability and mouthfeel.

EXAMPLE 17

A lemon pie filling composition is prepared by first preparing a dry mix having the following components:

|  | wt. % |
| --- | --- |
| Purity NCS-A corn starch[1] | 35.23 |
| Purity W waxy maize starch[1] | 30.41 |
| Powdered lemon juice corn starch[2] | 19.00 |
| Anhydrous citric acid, fine granular | 6.64 |
| Sodium hexametaphosphate, food grade powder | 2.86 |
| Low acetylated xanthan gum | 2.49 |
| Salt | 1.55 |
| Locust bean gum | 1.32 |
| Titanium dioxide | 0.32 |
| Sodium benzoate | 0.12 |
| FD&C Yellow #5 | 0.06 |

[1]National Starch, Bridgewater, NJ
[2]Borden Inc., Columbus, OH

The dry mix is prepared by first blending the salt, titanium dioxide, sodium benzoate and colorant, followed by the addition of citric acid, sodium hexaphosphate, low acetylated xanthan gum and locust bean gum to the blend. After mixing for about 5 minutes, the starches are added with additional mixing, followed by screening through a 30-mesh screen.

The lemon pie filling is completed by first adding sugar (1362 g) to 2841 g water and bringing the mixture to a boil. The dry mix (342 g) described above is dissolved in 1894 g water by stirring and then that mixture is poured into the hot sugar solution. The filling is then brought to a boil and then poured into prebaked pie shells.

EXAMPLE 18

An orange oil emulsion for use in beverage production is prepared having the following components:

|  | wt. % |
|---|---|
| Water | 75.85 |
| Gum arabic | 7.00 |
| Low acetylated xanthan gum | 0.90 |
| Citric acid, anhydrous | 0.30 |
| Sodium benzoate, powdered | 0.15 |
| Weighted cold pressed orange oil | 15.00 |
| 20-fold orange oil | 0.80 |

The orange oil emulsion is prepared by first dry blending the low acetylated xanthan gum and gum arabic. The blend is then hydrated in the water with agitation. Next, the sodium benzoate and citric acid are added with mixing until dissolved. The orange oils are blended and then mixed with the aqueous mixture. The resulting orange oil emulsion is then homogenized in two stages (1st stage: 3000 psi; 2nd stage: 500 psi).

The orange oil emulsion is storage stable and is used to prepare carbonated orange drinks.

EXAMPLE 19

An orange oil emulsion is prepared in a manner substantially similar to Example 15, with the exception that the gum arabic is replaced by PURITY gum BE modified food starch (5% wt.) (available from National Starch, Bridgewater, N.J.), the acetylated xanthan gum is reduced to 0.60% wt. and the water is increased to 78.15% wt. The resulting orange oil emulsion is stable and is used to prepare carbonated orange drinks.

EXAMPLE 20

A pina colada cocktail mix is prepared having the following components:

| Part 1: | wt. % |
|---|---|
| Water | 49.37 |
| Low acetylated xanthan gum | 0.37 |
| Sodium benzoate | 0.10 |
| Potassium sorbate | 0.10 |
| Polysorbate 60 | 0.10 |
| Sodium hexametaphosphate | 0.10 |
| Titanium dioxide | 0.05 |

| Part 2: | % wt. |
|---|---|
| Cream of coconut | 24.69 |
| Pineapple juice, frozen concentrate, 48° Brix | 14.81 |
| High fructose corn syrup, 42% fructose, 71 Brix | 9.87 |
| Citric acid, anhydrous | 0.37 |
| Coconut flavor | 0.07 |

The pina colada cocktail mix is prepared by first blending the dry ingredients of Part 1 then slowly adding the blended dry ingredients to the water at a temperature of about 38° C. The Polysorbate 60 is warmed to melt and added to the mixture. Next, the ingredients of Part 2 are added with mixing, following by homogenization at 60–65° C. and 3500 psi. The resulting pina colada cocktail mix is stable.

EXAMPLE 21

Three lots of non-acetylated xanthan gum (21A, 21B and 21C) were prepared in a manner similar to that described in Example 1, Part B, with the exception that lots 21A and 21C were prepared with nonacetylated xanthan derived from an X1910 strain of xanthomonas campestris deposited in the American Type Culture Collection (ATCC), Manassa, Va., and having an ATCC designation of PTA-31. Both lots 21A and 21B were pasteurized at 90° C. for 5 minutes. The acetate content of the xanthan gums were as follows:

|  | 21A | 21B | 21C |
|---|---|---|---|
| Acetate Content (wt %) | 0.3% | 0.7% | 0.2% |

The nonacetylated xanthan gums were then added to Diet Coca-Cola® and tested for stability in the manner described below. First the cola beverage was degassed under vacuum with stirring. The nonacetylated xanthan was diluted in deionized water to a concentration of 2% by weight. The concentrate was then added to the degassed beverage so that 0.05% by weight of the nonacetylated gum was present in the beverage.

The viscosity of the cola beverage containing nonacetylated xanthan gum was measured on a Vilastic VE Rheometer (Vilastic Scientific, Austin, Tex.) at a frequency of 3 Hertz and 75% strain (~14.2 sec$^{-1}$). Aliquoits of the cola beverages were sealed in 25 ml vials and stored in a 45° C. oven. Viscosity measurements were performed over time. The results are set forth in Table 3 below.

TABLE 3

| Xanthan in Cola | Initial Viscosity | 1 week | 3 weeks | 4 weeks | 6 weeks | % Vis 6 weeks |
|---|---|---|---|---|---|---|
| 21A | 5.78 | 5.67 | 4.92 | 4.88 | 4.74 | 82.0 |
| 21B | 5.49 | 5.31* | 4.76 | 4.66 | 4.38 | 79.4 |
| 21C | 5.93 | 5.42 | 5.27 | 5.08 | 4.84 | 81.6 |

*precipitation observed

These results show that acidic beverages containing non-acetylated xanthan gum have excellent viscosity stability.

Other variations and modifications of this invention will be obvious to those skilled in this art. This invention is not to be limited except as set forth in the following claims.

What is claimed is:

1. An acidic edible liquid composition comprising a low acetylated xanthan gum in an amount effective to substantially sustain the initial viscosity of said composition for at least 4 weeks at a storage temperature of 45° C. or less.

2. A composition according to claim 1, wherein said edible liquid composition is selected from the group consisting of acidic syrups, acidic beverages, tartar sauce, relishes, bakery flavor emulsions, bakery fillings, salad dressings and flavor oil emulsions.

3. A composition according to claim 2, wherein said composition is the syrup or beverage containing a flavor selected from the group consisting of cola, lemon, grape and orange.

4. A composition according to claims 1 or 2, wherein said low acetylated xanthan gum has an acetate content of 0 to about 1.5% by weight of the xanthan gum.

5. A composition according to claim 4, wherein said acetate content is 0 to about 1.0% by weight of the composition.

6. An acidic syrup composition according to claim 2, wherein said low xanthan gum is present in an amount from about 0.024 to about 0.6 percent by weight of the composition.

7. An acidic beverage composition according to claim 2, wherein said low acetylated xanthan gum is present in an amount from about 0.004 to about 0.1 percent by weight of the composition.

8. A composition of claims 1 or 2, wherein the pH of said composition is below about 7.

9. A composition according to claim 8, wherein the pH of said composition is below about 4.

10. A composition according to claim 9, wherein the pH of said composition is from about 2.0 to about 3.9.

11. A composition according to claim 1, wherein said initial viscosity does not decrease more than 15% over a eight month period of time at a temperature of 21° C.

12. A composition according to claim 1, wherein said initial viscosity does not decrease more than 5% over a four month period of time at a temperature of 21° C.

13. An acidic syrup composition comprising:
   (a) low acetylated xanthan gum in an amount of about 0.006 to about 1 percent by weight of the composition;
   (b) at least one sweetener in an amount effective to sweeten a beverage prepared from said syrup composition;
   (c) at least one food grade acid in an amount effective to provide said syrup with a pH below 7;
   (d) a flavor; and
   (e) water.

14. An acidic syrup composition according to claim 13, wherein said sweetener is selected from the group consisting of sucrose, aspartame, acesulfame-K, sucralose, saccharin, alitame, cyclamates, stevia derivatives, thaumatin, polyol sugar alcohols, high fructose corn syrup, invert sugar, dextrose, crystalline fructose, high conversion corn syrup and mixtures thereof.

15. An acidic syrup composition according to claim 13, wherein said food grade acid is selected from the group consisting of phosphoric acid, citric acid, ascorbic acid and mixtures thereof in an amount of above 0.2 to about 0.4 percent by weight of the composition.

16. An acidic syrup composition according to claim 13, wherein said favor is selected from the group consisting of cola, orange, grape and lemon flavor.

17. An acid beverage composition comprising:
   (a) low acetylated xanthan gum in an amount of about 0.001 to about 0.5 percent by weight of the composition,
   (b) at least one sweetener in an amount effective to sweeten said beverage composition;
   (c) at least one food grade acid in an amount effective to provide said beverage with a pH below 7;
   (d) a flavor; and
   (e) water.

18. An acidic beverage composition according to claim 17, wherein said sweetener is selected from the group consisting of sucrose, aspartame, acesulfame-K, sucralose, saccharin, alitame, cyclamates, stevia derivatives, thaumatin, polyol sugar alcohols, high fructose corn syrup, invert sugar, dextrose, crystalline fructose, high conversion corn syrup and mixtures thereof.

19. An acidic beverage composition according to claim 17, wherein said food grade acid is selected from the group consisting of phosphoric acid, citric acid, ascorbic acid and mixtures thereof in an amount of about 0.02 to about 0.14 percent by weight of the composition.

20. An acidic beverage composition according to claim 17, wherein said flavor is selected from the group consisting of cola, orange, grape and lemon flavor.

21. A method for stabilizing an acidic edible liquid composition which comprises adding an effective amount of a low acetylated xanthan gum to said composition to substantially maintain the initial viscosity of said composition for at least 4 weeks.

* * * * *

UNITED STATES PATENT AND TRADEMARK OFFICE
CERTIFICATE OF CORRECTION

PATENT NO. : 6,139,895  
DATED : October 31, 2000  
INVENTOR(S) : Linda J. Zablocki et al.

Page 1 of 1

It is certified that error appears in the above-identified patent and that said Letters Patent is hereby corrected as shown below:

Title page,  
Column [56],  
References cited, under U.S. PATENT DOCUMENTS:  
"Campaigne" should read -- Campagne --.

Column 1,  
Line 18, "filings." should read -- fillings. --.

Column 5,  
Line 9, "bakery fillings," should be deleted; and  
Line 13, "menth," should read -- menthe, --.

Column 14,  
Line 4, "Manassa," should read -- Manassas, --.

Column 15,  
Line 12, "a" should read -- an --.

Column 16,  
Line 4, "favor" should read -- flavor --; and  
Line 8, "composition," should read -- composition; --.

Signed and Sealed this

Twenty-third Day of October, 2001

Attest:

*Nicholas P. Godici*

NICHOLAS P. GODICI  
*Acting Director of the United States Patent and Trademark Office*

*Attesting Officer*